United States Patent [19]
Cesulka et al.

[11] Patent Number: 6,078,632
[45] Date of Patent: Jun. 20, 2000

[54] MINIMALIZED DECOMMUNICATION OF SERIALIZED TELEMETRY DATA

[75] Inventors: John L. Cesulka, Walton Beach; David M. Onuffer, Mary Esther, both of Fla.

[73] Assignee: The United States of America as represented by the Secretary of the Air Force, Washington, D.C.

[21] Appl. No.: 09/061,355

[22] Filed: Apr. 15, 1998

[51] Int. Cl.[7] ........................................ H04L 7/00
[52] U.S. Cl. ............................................. 375/368
[58] Field of Search ................................. 375/368

[56] References Cited

U.S. PATENT DOCUMENTS

| | | | |
|---|---|---|---|
| 4,084,251 | 4/1978 | Gillis, Jr. | 708/403 |
| 4,103,234 | 7/1978 | Frazier | 375/360 |
| 4,772,889 | 9/1988 | Elleaume | 342/194 |
| 4,970,674 | 11/1990 | White | 708/404 |
| 5,016,005 | 5/1991 | Shaw | 340/870.19 |
| 5,059,968 | 10/1991 | Thompson et al. | 342/152 |
| 5,093,801 | 3/1992 | White et al. | 708/404 |
| 5,227,783 | 7/1993 | Shaw | 340/870.19 |
| 5,270,705 | 12/1993 | Duffy | 340/870.13 |
| 5,303,172 | 4/1994 | Magar et al. | 708/406 |
| 5,305,007 | 4/1994 | Orr et al. | 342/20 |
| 5,508,538 | 4/1996 | Fijany et al. | 257/214 |

OTHER PUBLICATIONS

Subminiature Telemetry Transmitter, A Robust Remote Data Acquisition and Transfer System, Harris Corp, Jul. 1993.

*Primary Examiner*—Stephen Chin
*Assistant Examiner*—Paul N Rupert
*Attorney, Agent, or Firm*—Gerald B. Hollins; Thomas L. Kundert

[57] ABSTRACT

A low cost dedicated hardware arrangement for reconstructing successive data frames from for example a commutated telemetry-communicated serial stream of digital and analog data, data which may be of unspecified words per data frame content. Encoding and detection of a word length synchronization signal within each data frame of the stream in accordance with the protocol of a commercially available telemetry encoder/transmitter apparatus is contemplated in the disclosed embodiment of the invention. The disclosed system is tailored for minimum communication protocol flexibility along with minimum fabrication and utilized space costs. Use in the spread spectrum telemetry environment and fabrication using dedicated logic array techniques are also contemplated. Military and non-military uses of the system are feasible including uses in medical environments.

21 Claims, 3 Drawing Sheets

MINIMALIZED DECOMMUNICATION OF SERIALIZED TELEMETRY DATA

RIGHTS OF THE GOVERNMENT

The invention described herein may be manufactured and used by or for the Government of the United States for all governmental purposes without the payment of any royalty.

BACKGROUND OF THE INVENTION

This invention concerns the field of electrical signal transmission via a serial telemetry link and to the reconstruction of such transmitted data to original analog and digital forms in an economical manner.

The testing of multi-warhead and dispensed munition delivery systems presents a unique need to send data from many warheads to a single receiving station. Many tested items (e.g., warheads) need to transmit their data sets simultaneously to the ground station not only at the moment of their group release, but also at the instant they are dispersed toward their individual target or targets. With the use of conventional methods, multiple transmitter - receiver - decommutator equipment lines, one transmitter - receiver - decommutator equipment line for each test item and frequency are needed to accommodate such data sets. Using Direct Sequence Spread Spectrum (DSSS) modulation and Code Division Multiple Access (DCMA) techniques however, many test signals can occupy one wider frequency channel. The greatest advantage thereby achieved, is the economy of a single frequency receiver - demodulator - decoder equipment line combination at the ground station.

In using such an arrangement as a framework for the present invention the programmable code transmitters allowing each digital bit stream to be extracted from the single frequency channel are obtained from a commercial vendor in subminiature form (a form which comprises transmitters, but not decoders) and such programmable code transmitters are not therefore part of this invention. In using such a telemetry arrangement however the ground station decoder output is where the single equipment line economy stops because there are as many data streams emerging at this point in the ground station as there are transmitter input test items. This invention recognizes a unique necessary attribute of the transmitter commutation order and architecture used by one, and indeed probably necessarily used by any possible transmitter arrangement, in achieving a decoder allowing a dramatic simplification and economy in the way the many data streams are decommutated into digital byte representations and reconstructed into final forms at the ground station. The final signal form may be the same as the test item transmitter or analog converted for convenience. This invention simplifies the consolidates the decommutation of many transmitter data streams, in effect, continuing the single equipment line cost advantages of Code Division Multiple Access and Direct Sequence Spread Spectrum technology.

The receiver-end processing of telemetry data has also received commercial integrated circuit attention as is for example suggested by the two issued U.S. patents of H. L. Shaw, i.e. U.S. Pat. Nos. 5,016,005 and 5,227,783. The systems described in these and other examples of prior art telemetry systems have progressed significantly in the direction of flexibility and capability to accommodate plural communication functions. The invention described herein is believed however to add a significant additional degree of simplification and optimization to telemetry receiver-end processing. Moreover this simplification and optimization is believed applicable to data links other than those involved with missile and munitions testing and could for example be useful in vehicle and medical communication endeavors both with and without radio frequency linkage equipment.

Electrical apparatus which is commercially available at the time of preparing the present patent document is therefore known to be capable of decommutating serial telemetry data signals into an original parallel digital data format or an analog data format at the receiver end of the telemetry link.

Equipment for transmitter encoding, received signal decoding / and for signal identification for example has been made by Harris Corp. of Melbourne, Fla. Also general purpose decommutator circuits and signal reconstruction hardware circuit arrays, organized by one or two data streams, are available from Berg Systems of Carlsbad, Calif. and Veda Systems of California, Md. These general purpose decommutators have great flexibility and require telemetry frame specifications to be transferred into the decommutator circuit cards by computer. (For examples, the Berg 4411 card is a single decommutator, the 4417 card an 8 channel Digital to Analog signal reconstructor.) The present invention however replaces hardware and software of these types. The present invention is also advantageous in that it requires no telemetry frame specification other than the synchronization or synch word pattern. The architecture of the transmitter, defines each two byte sequence in a way that allows the present invention to cause singular recognition of the synch word without knowing frame length. The desirable end result is the ability to immediately decommutate and reconstruct or convert many digital data streams from the provided decoder with minimal hardware and no support computers. According to an advantage of the invention therefore no specifications are necessary for differing frame lengths.

The concepts of the present invention are therefore disclosed herein in terms of a specific radio frequency link telemetry transmitter and its communication protocol, i.e., in terms of the transmitter provided since at least the early 1990's by Harris Corporation under the name of "Subminiature Telemetry Transmitter SMT0001". The characteristics of this particular telemetry transmitter and indeed other specific influences including for example the telemetry protocol adopted by certain weapons testing facilities (such as the United States Air Force Eglin Air Force Base weapons test range) dictate specific details of the invention disclosed in this document. It is believed that modification of the disclosed apparatus into other forms is within the capability of persons of ordinary skill in the electronic and telemetry arts and therefore within the scope of the present document.

The present invention is believed useful in testing multiple warhead weapons where the simultaneous transmission from diverging warheads could be to a single receptor. Non weapons telemetry uses of the invention are also contemplated, uses such as in hospital/medical and industrial environments. In a hospital for example, need arises to communicate a plurality of vital signs medical data signals from one or several patients to a central point for monitoring or examination. The invention could also be used to send a real time multi-lingual translation on one channel, with the translations to be sorted at a remote location by a single receiver-decoded in accordance with the present invention.

SUMMARY OF THE INVENTION

The present invention provides for improved decommutation processing of serially communicated telemetry data at a data link terminal. The processing of the invention is particularly adapted to the needs of reconstructing signals from commutated digital byte forms in a spread spectrum radio frequency data link.

It is an object of the present invention therefore to accept and process in parallel fashion data streams as clock-data pairs for decommutation.

It is an object of the present invention to provide improved data received end processing of a serial telemetry data stream.

It is an object of the present invention to provide commutated data identity by particularized sorting from data temporal position.

It is an object of the present invention to provide reconstructed signal representations of decommutated byte data which include analog signals, serial clocked data formats and parallel byte data.

It is another object of the invention to provide improved data receiver end processing of a combined digital and analog telemetry data stream.

It is another object of the invention to provide simplified low cost decommutation for data signals of differing data frame length.

It is another object of the invention to provide simplified, inflexible but low cost decommutation for signals arranged according to a particular frame protocol.

It is another object of the invention to provide decoded synchronization signals-controlled signal decommutation.

It is an object of the present invention to recognize a synchronizing two-byte word in a stream of commutated data and thereby organize bits and bytes of the data stream into appropriate data processing channels.

It is an object of the present invention to recognize a synchronizing two-byte word in a stream of commutated data and thereby segregate the synchronizing word from the data stream.

It is another object of the invention to provide synchronization signals-controlled decommutation for signals of mixed analog and digital types including serial and parallel digital signals.

It is another object of the invention to provide simplified low cost decommutation and reconstruction for a plurality of pairs of clock and data signals (e.g., 10 pairs) received from the output of a telemetry decoder circuit.

It is another object of the invention to provide simplified low cost decommutation for a plurality of pairs of clock and data signals received as sequentially arrayed bits in a plurality of data frames from a telemetry decoder circuit.

It is another object of the invention to provide simplified low cost decommutation for a plurality of pairs of clock and data signals which represent both analog and digital input data.

Additional objects and features of the invention will be understood from the following description and claims and the accompanying drawings.

These and other objects of the invention are achieved by a hardware device dedicated to decommutation, and sorting by time position, the reconstruction and reinterpretation of multiple streams of serial data, from the general form of a received clock and data signal pair, representing data from one of plural receivable synchronous data transmitters each having interleaved analog and digital data bytes, said device comprising the combination of:

a serial input data register for each of said serial clock and data byte signals, said serial input data registers being coupled by a two byte input serial data path to a receiver of said streams of serial data;

a synchronization word recognizer coupled by a parallel data bus to said serial input data registers output and generating a sync detected output signal in response to synchronization word recognition;

digital to analog converter output apparatus controllably coupled to most significant bits portions of said serial input data registers by a data path inclusive of a twos complement data approximation generating apparatus;

digital data storage output apparatus controllably coupled to least significant bits portions of said serial input data registers;

control means connected to each of said output apparatus and responsive to said sync detected output signal for enabling transmitter input timing-determined updating of each said output apparatus;

said control means including flip flop means inhibiting data updates to said output apparatus between said sync detected output signal and a next ensuing signal data word;

said control means also including control gate means enabling update of each said output apparatus at mid clock cycle times following data settlement;

said control means also including control gate means precluding update of each said output apparatus with incomplete data byte pairs from said serial input data registers;

said control means also including control gate means precluding update of each said output apparatus with synchronization word data from said serial input data registers;

said control means also including control gate means terminating update of each said output apparatus from said serial input data registers prior to commencement of a next following clock cycle;

said control means also including counting means tracking time position of input data bytes in said serial input data registers and means for resetting said counting means in response to said sync detected output signal;

said control means also including counter means for determining completed receipt of said input data signal byte pairs in said serial input data registers;

said control means also including counter means for distinguishing between said analog and digital data signal byte pairs and controlling loading of said interleaved analog and digital data bytes into said output apparatus.

DETAILED DESCRIPTION

In the data telemetry art it has become generally accepted that the term "commutation", a term often employed in the electrical switching and electrical motor arts for examples, now also relates to the assembling of data bytes at a data sending location (such as the airborne transmitter of an air to ground data link) prior to their transmission over a telemetry link. In practice there may be several of these sending locations and links of interest during a particular data generation event. In the data telemetry art the related term "decommutation" has come to describe the sorting of such data bytes into original data form at the telemetry ground station—after a decoder system has identified the stream from each of several possible sending locations or sending transmitters as a stream to be decommutated. The present invention relates to the latter or "decommutation" of these concepts.

Figure 1:
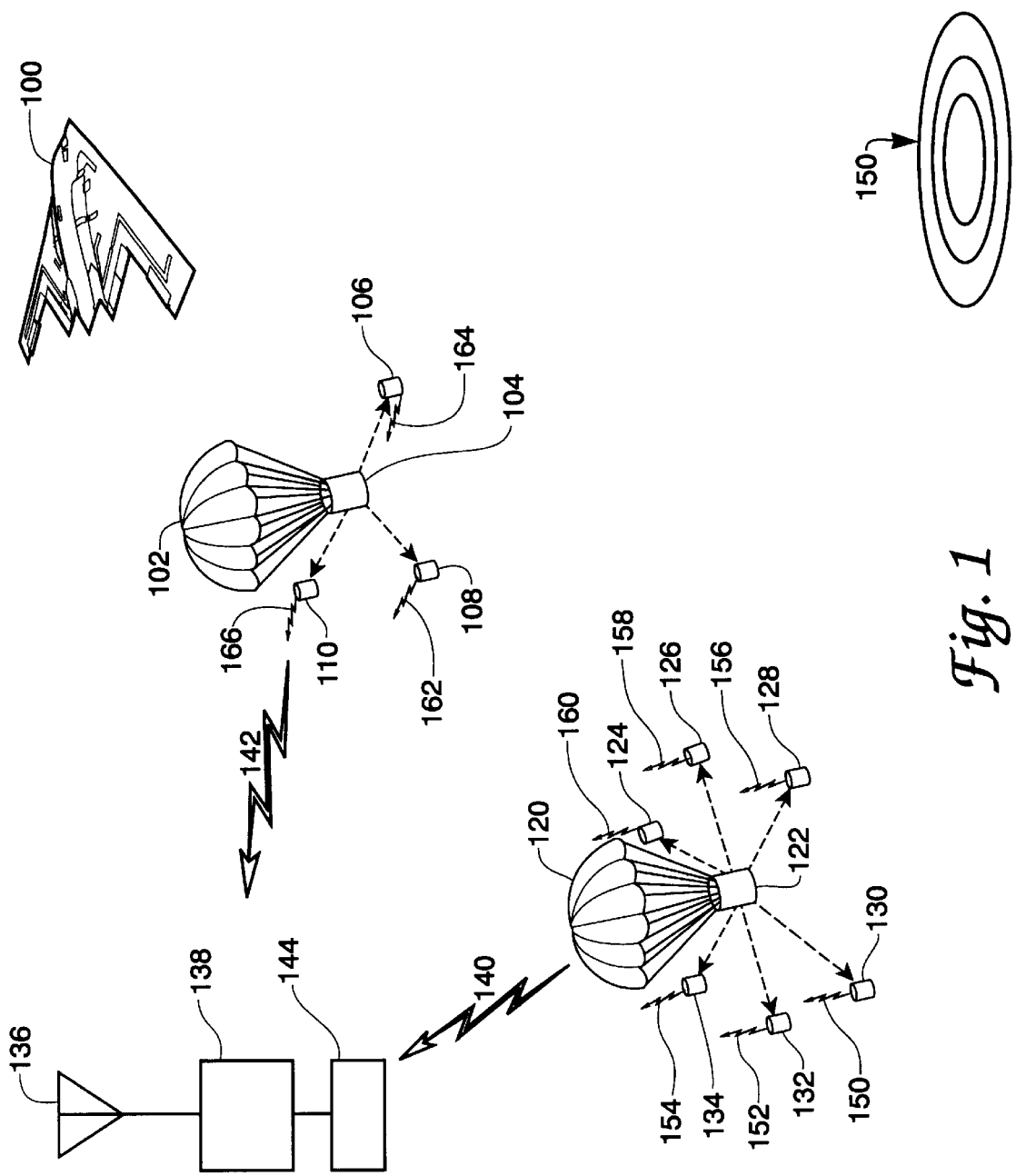
FIG. 1 shows a typical use environment for the invention in a weapons testing telemetry scene.

FIG. 1 in the drawings shows a typical use environment for the present decommutation invention in a weapons testing telemetry scene. In the FIG. 1 drawing an aircraft 100 has deployed two parachute assisted multiple warhead munitions devices (e.g., two cluster bombs) 104 and 122 into trajectories intended to reach a selected target 150. In the testing scene represented by FIG. 1 each of the devices 104 and 122 is suspended from a descent-control parachute 102 and 120 and is communicating radio frequency telemetry data signals, represented by the symbols 140 and 142, to a remotely located monitoring receiver 138 by way of a receiver antenna 136. Similarly each of the individual warheads 106–100 and 124–134 in FIG. 1 once deployed communicates data as represented at 150–166 to the receiver 138 by way of antenna 136. The signals 140 and 142 in the FIG. 1 scene may indicate the occurrence of events of interest within each of the devices 104 and 122 and could for example include digital signal representations of the pre detonated device attaining a specific altitude, the initiation of an individual warhead deployment event and the fully deployed device remainder encountering the earth. In addition to these digitally represented events, the signals 140 ad 142 may also include analog signal components representing factors such as the operating temperature of critical components within the devices 104 and 122, attained device altitude and force magnitudes experienced during the individual weapons deployment event. The individual warhead signals 106–110 and 124–134 may represent similar events from the individual warheads in a post deployment time frame.

In the FIG. 1 scene a total of eleven data generating sources are represented—each providing multiple digital and analog signals, signals which must be uniquely identified, processed and returned to some original signal form in the apparatus 144 connected with the receiver 138. A certain part of this apparatus 144, a part relating to the decommutation of signals emanating from the receiver 138 back into an original data format, is the subject of the present invention. Before considering the apparatus 144 and this decommutation in detail however it may be helpful to appreciate additional details relating to the FIG. 1 scene.

The FIG. 1 scene actually represents an improved telemetry arrangement in the sense that data from several sources, data from air to ground for example is being received and processed in what is depicted as a single receiver, 138, and a single processor, the processor 144. In what may termed a more conventional (or older) arrangement of the FIG. 1 scene there could be many receivers and processors of the general nature shown at 138 and 144 (and conceivably many antennas as shown at 126) with each such receiver and processor being assigned to but one of the eleven data sources represented in FIG. 1 (understanding thereby that each of the numbers 104, 106, 108 and 110 and so-on indicates an individual data source). In the improved FIG. 1 system therefore it is assumed that a single receiver 138 is able to identify and separate/decode the voice of each of each employed transmitter.

In FIG. 1 therefore it is assumed that receiver 138 has eleven clock-data output pairs, one output pair for each of eleven airborne transmitters, one transmitter at each of the eleven signal sources represented in FIG. 1. All of these transmitters occupy the same bandwidth as if they were on separate frequencies side by side. One advantage of the improved system thus arranged is that no radio frequency spectrum space is wasted separating transmitter frequencies to avoid interference because they can all be centered on the same frequency. The mathematical separation of transmitter signals is possible because of the way each transmitter's data is tagged with a unique embedded (convolved) statistical pattern that is individually recognized and sorted by the decoder of item 138. Neither the transmitter nor the decoder is however part of this invention. This invention merely takes advantage of the constrained order in which the transmitter data bytes are sent out (commutated). The present invention uses this transmitter imposed commutation order constraint to build the most efficient and convenient way to sort (decommutate) the bytes for each of many transmitters. The present invention portion of box 144 accepts a stream of bytes representing the separate voice of each transmitter. In the preferred arrangement of the invention the transmitter memories may hold frames of byte sequences in excess of 8100 bytes, but the invention doesn't care. The invention only cares that bytes are framed on pairs; an even count in each frame.

In the course of state of the art testing the FIG. 1 scene often takes place on a "test range", i.e., often at a water adjacent government owned site for missile launching or munitions development or weapons testing. According to further aspects of this testing each of these test ranges is operated under an established set of rules and procedures, rules and procedures which may differ in detail from range to range and rules and procedures which include such specific details as the telemetry protocol to be used by visiting organizations desiring to conduct testing events on the range.

The different rules and procedures at different test ranges imposes a requirement for flexibility on commercial equipment for use in FIG. 1 scenes. In order to meet the requirements of different test ranges and different tests to be accomplished at these ranges it is necessary for commercial vendors (such as the above identified Harris Corporation, Berg Incorporated and Veda Incorporated) to design telemetry electronics integrated circuit devices for example to accommodate different selections of signal data rate, and different synchronization words.

The telemetry data signals represented in FIG. 1 may be disposed in serial format and for example in a format wherein a frame of data is composed of a specific number of serially disposed data words. Each word of this serial data may include a specific number of bytes of data, a byte consisting of for example eight binary bits of data and two byes comprising a serial word. According to a feature of the present invention the number of data words included in a data frame in umlimited. It has become common practice to communicate each signal in the FIG. 1 scene by way of a spread spectrum, radio frequency link.

The Harris Corporation "Subminiature Telemetry Transmitter, a robust remote data acquisition and transfer system", is described in a government-circulated catalog dated July 1993. This catalog includes a block diagram and several pages of use application data relating to employment of the Harris transmitter in different telemetry scenes. Included in these use applications are for example "modern weapon system telemetry" an application of the FIG. 1 nature; "video data transfer" a video camera associated usage; "wireless environmental monitoring"; a use in observing conditions within inaccessible locations; "time space and position information" a position tracking usage which could also have FIG. 1 utility; and "remote data transfer" a use to monitor medical or other data and also having FIG. 1 relationships. In the present description a Harris Subminiature Telemetry Transmitter, (STT herein) is presumed to be present in each of the FIG. 1 signal sources, i.e., in each of the devices and each of the warheads 104–110 and 124–134. Therefore the serial telemetry data arriving at the apparatus 144 is formatted according to the STT protocol in the following disclosure and references to the STT appear in the following text. The contents of the Harris catalog for the STT device is therefore hereby incorporated by reference herein.

One significant aspect of the STT protocol is for example concerned with the data word frame for signals emerging from the receiver 138 in FIG. 1. According to this protocol for example words of digital data in both serial and parallel data forms are communicated by the FIG. 1 signals as are words of digitally converted analog data. Such digital and analog data words are alternating in the STT communicated data word. Moreover the same data may be repeated plural times in a particular data frame—for frame filling purposes. The following exemplary data frames constitute the possible frames which can be generated in the Harris STT circuit; notably in each of these data frames, digital and analog data alternate in occurrence.

Frame 1. Synchronization Word, Analog Word 1, Digital Word, Analog Word 1, Digital Word.

In symbolic form this word may be represented as XWD A1 D A1 D.

Data frames of this form may be of any length up to a 512 byte limit and require one digital to analog converter in the FIG. 1 apparatus 144. Two line to four line decoders and associated latches are not required for words of this nature.

Frame 2. XWD A1 S A1 D.

Data frames of this form may also be of any length up to the 512 byte limit. Two line to four line decoders and associated latches are required for words of this nature.

Frame 3. XWD A1 S A2 D A3 S A4 D.

Data frames of this form may be of any length up to the 512 byte limit and require four digital to analog converters in the FIG. 1 apparatus. Two line to four line decoders and associated parallel data latches are required for words of this nature.

A synchronization word, XWD, in these data frames is identified by having the most significant bit of the frame set to a true or "1" value. Non Synchronization words, D and S words, in these examples, have the most significant bit set at zero.

If NA is a byte related to a serial or parallel transmitter port, and Ax is one of four analog input channels; XWD, A1, NA would be the smallest frame possible. XWD is a two byte synch word and A1, NA is a byte pair that would be repeated many times so that half the time is not spent away from data. The invention seeks only to reconstruct or reinterpret the data inputs to the transmitter. In the FIG. 2 functional block diagram the "A1" byte goes to D/A converter 254 to become an analog signal and "NA" byte only needs to reach latch 246. The word counter 214 and decoder 225 are not needed since no other outputs need to be enabled in sequence. Other output circuits could be added to the output of latch 246. If the NA byte were from a serial input, a parallel to serial shift register circuit could reconstruct this format from the data in latch 246.

A frame using all the features of the transmitter within its commutating constraints would be: XWD, A1, NAS, A2, NAP, A3, NAS, A4, NAP. The NA bytes may be alternating serial-parallel interpretations; the maximum set, less XWD repeated at any length. Counter 214 and the counter 214 output on line 256 now alternately routes the NA bytes in every other word to different output ports for appropriate parallel or serial handling. The symbol "S" in the above exemplary frames represents such serially-handled data. The analog byte of every word is at the door of every A/D converter like converter 254 but the two line to 4 line decoder 225 has sequential outputs that enable the data for 254 on the first byte pair, and the second A/D (lines 226) on the second byte pair in 206 etc. in shift register sequence. Miniature digital transmitter with synchronously timed architectures will likely have a small number of channel inputs that will be repeated following a standard 16 bit synch word. Synchronicity may force non-analog interleaving of channel types to allow transmitter A/D settling time. In this event, many transmitter streams can be cheaply sorted, without regard to frame length, using this invention. The digital processing for at least four transmitter streams has been implemented in a single gate array.

The analog data decommutated in the present invention originates in a telemetry transmitter which has also digitized an analog waveform into an eight-bit twos complement representation. This analog data is serialized into the data frame between representation of the serial and parallel digital data according to the Harris STT data frames above— in order to allow the digital to analog converter circuits to prepare for or settle for subsequent data representations. In the STT a sixteen bit synchronization word is always followed by a series of analog and non digitized bytes which are commutated in most significant bit first order. In order to avoid an excessive presence of synchronization bytes to data bytes with the relatively few three data channels in the STT, the data is often repeated to make a longer major frame.

Figure 2:
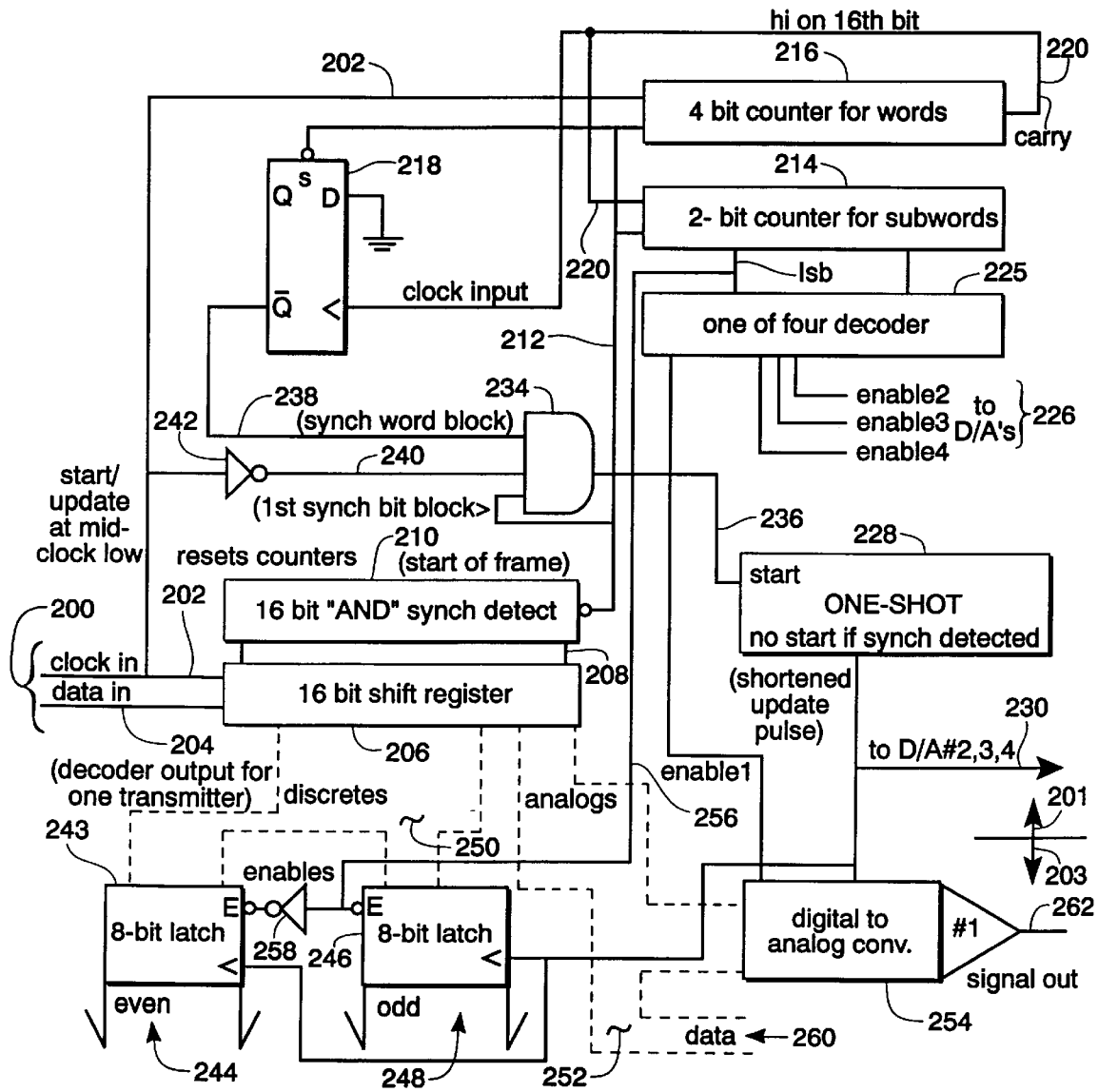
FIG. 2 shows a functional block diagram of a system according to the invention.

Turning now expressly to the FIG. 2 drawing, generally the FIG. 2 circuit serves to determine when a serially received byte comprises data and sends such data to digital to analog converter circuits if analog in nature or alternately to a parallel data bus if the data is digital in nature. FIG. 2 therefore shows a detailed block diagram of a decommutation system made in accordance with the present invention. Parallel bus digital data in FIG. 2 may comprise transmitter data that was collected through a serial channel or a parallel or discrete channel in the transmitter of the devices of FIG. 1. Determination of when a serially received byte is in fact not data is accomplished by searching for a selected or predetermined synchronization code in the received data and identifying the accompanying word of code as a non data, i.e., as a synchronization word.

Generally according to a range protocol considered herein a data frame may be of any length up to 512 bytes (of eight bits each) plus a synchronization word of two bytes or sixteen bits in order to qualify for the best i.e., class 1 support by installed range equipment. Moreover at this considered test range a standardized synchronization word comprised of the hexadecimal digit code EP90 is established. Other codes and conventions can be used by an organization visiting the range however greater amounts of setup word are required including adaptations within the FIG. 1 apparatus 144 in the present invention. A typical data frame which is in accordance with the above frame representations, a frame which minimizes synchronization overhead may be of 512 bytes length plus a synchronization word and repeats the minimum frame A1 S A2 D A3 S A4 D sixty four times.

The FIG. 2 system generally consists of a data assembling and processing portion located in the lower drawing region identified by the right margin arrow 203 and a synchronization detection and blocking portion located in the drawing region identified by the adjacent arrow 201. In the FIG. 2 synchronization detection and blocking portion 201 therefore, serially disposed clock and data word signals are received at 200 on the respective signal paths 202 and 204 and communicated into a serially loaded overflowing type of shift register 206. In shift register 206 sixteen bits or one word of serial data are accumulated before newly arriving data begins to displace the older data one bit at a time from the rightmost shift register end. During data arrival the data contents of the shift register 206 are continuously examined for a sixteen bit sequence conforming precisely with the selected synchronization word encoded into each data frame at the data transmitter. This examination is accomplished using the sixteen bit "AND" of the synchronization detector 210. The parallel data path 208 couples shift register data to the synchronization detector 210.

Detection of a sixteen bit match between shift register data and the encoding present in synchronization detector 210 results in a synchronization word blocking event, a sequence involving an output signal on the path 212 and a partial enabling of the "AND" gate 234. Such synchronization word detection also causes incrementing of the counters 214 and 216 and a set-enabling of the flip flop 218. Collectively these events preclude an interpretation of the synchronization word as valid data. For words which are not synchronization code and are therefore data, temporary word storage in either the discrete or digital data communication along the analog path 250 then latches 243 and 246 and conversion by the digital to analog converter circuits one of which is shown at 254 in FIG. 2 ensues. The digital to analog converter circuits act on the first received data of a word following a synchronization word, data which is shown in the exemplary data frames for the STT device above to comprise digital converted analog data received from the exemplary signal sources in FIG. 1. Data for the additional three digital to analog converter circuits provided—for in the FIG. 1 drawing communication along the digital data path 250 then appears at 260 and the enabling pulses for the three not shown digital to analog converters appears on the enable lines at 226. The data coupled to each of the digital to analog converter circuits is presumed to be modified by passage of the most significant bit from the shift register 206 through a logical inverter, not shown in FIG. 2, in order to approximate the two's complement form of digital converted analog data.

The four bit word counter 216 in FIG. 2 provides a zero to fifteen count of word clock pulses received from the path 202 upon enablement by the synchronization word detected signal on path 212. At the end of this count of 16 the flip flop 218 is toggled and its output on path 238, in coincidence with the inverted clock signal of path 240 from inverter 242, provides a trigger pulse for the one shot multivibrator 228. Using other words, setting the flip flop 218 causes the "AND" gate 234 to block the data update pulse that would otherwise occur whenever the two bytes of a synchronization word are completely shifted into place in the shift register 206. Such blocking prevents the synchronization bytes that completed early in the clock cycle from being mistakenly used at the middle of the clock cycle. The flip flop 218 then resets when the first data word is complete.

The two bit counter 214 in FIG. 2 provides a zero to three count of word counts received on the path 220 from counter 216 upon enablement by the synchronization word detected signal on path 212. The least significant bit for each of these four counter states is decoded by the decode logic circuitry indicated at 225 to provide the four separate digital to analog converter circuit enable signals indicated at 226. the two bit counter 214 may be viewed as a Johnson counter used to sequence the steady stream of update pulses provided by the shift register 206 and the selective decoding logic in synchronization word detector 210; the decoder for the two bit counter 214 is the logical "AND" of each sequenced output from the shift register decoder 210 with the signal on path 236 which would otherwise update every word.

The output pulse of the multivibrator 228 is a pulse of selected microsecond time duration and provides an enable signal, appearing on path 248 at the time of mid clock, for both the digital to analog converter circuits at 254 etc. and the digital data latches at 243 and 246. The data from latches 243 and 246, the data at 244 and 248 respectively can provide input to specialized reconstruction circuits for binary data bytes. A current example of such specialized data is to put a printable character from a global position sensing receiver into the serial port of the transmitter and make the serial data latches at 243 an input to an asynchronous transmitter with RS 232 standard port serial output specifications.

It may be appreciated that data is shifted into the FIG. 2 processor synchronously on rising edges of signals. Moreover updates to the analog output signal happen at mid-clock cycle as determined by the one shot multivibrator 228 in order to assure that arriving data has settled before being used. The mid clock events are terminated by the one shot multivibrator 228 prior to the next data rising edge by a one shot pulse which expires well before the next rising data bit edge.

When the data pattern in the FIG. 2 shift register 206 matches the pattern in the synchronization detector 210 (or the pattern set into individual switches which may be used as a substitute for this synchronization detector), the FIG. 2 logic is reset except for the flip flop 218. The flip flop 218 being set causes the "AND" gate 234 to block the data update pulse that would otherwise occur whenever two input data bytes are fully shifted into place. Blocking prevents the synchronization bytes that completed early in the clock cycle from being mistakenly used at the middle of the clock cycle. The flip flop 218 blocks until the first data word is complete. There is ample time during the sixteenth clock cycle of the data word to settle data and clear the blocking before the mid-clock firing of the one shot 228.

From an overall timing-considered perspective of the FIG. 2 system, at the beginning of each data frame, the two bytes of the selected synchronization word (e.g., the EB90 word identified above) are detected by comparison in the synchronization word detector 210 to external bit settings using a comparator such as an HC 688 integrated circuit device or internally "ANDED" with a selected code such as the standard IRIG range word synchronization code. Since the synchronization word detector 210 has the direct path 212 to the synchronization blocking "AND" gate 234 and to flip flop 218 which latches with "AND" gate 234, the synchronization word begins blocking the data update pulse from the one shot multivibrator 228 long before mid clock. The flip flop 218 continues blocking as the "synchronization detected" signal on path 212 exits its detector 210 and does not enable data updates until after the sixteenth synchronization word bit has shifted out of the counter 216. The synchronization detector 210 also resets the counters 214 and 216 via the path 212 to assure an accurate commencement of the next data word frame. It is notable that the FIG. 2 system provides identification of the sixteen bit synchronization word early in the clock cycle, i.e., as the completing sixteenth bit is shifted in, and that this early identification enables exclusion of the synchronization word from the data stream in the FIG. 2 system.

By way of additionally clarifying parts of the above FIG. 2 description via use of different words, it may be appreciated that the port 200 receives the data stream associated with one of the airborne transmitters. There is no synchronization detection in the FIG. 2 system until two bytes that match the 16 bit synchronization word (XWD), which starts a major frame, fully arrive in shift register 206. These bits are presented on bus 208 to be anded with the XWD pattern on the other inputs to the XWD detector 210. If they match two things happen. All counters are reset to zero as a position reference for the data to follow, and the pulses that would otherwise tell output signal devices to accept the data (data enables and latches) are blocked. In other words, all data is passed unless XWD blocks it. Note also that data busses are presented to all functions of the FIG. 2 system. These functions however only accept / latch data and act upon it at the appropriate time instant.

With respect to timing considerations in the FIG. 2 system, the rising edge of the clock on input path 202 brings serial data into register 206. Inverter 242 assures nothing happens until the mid-cycle clock fall at which time the output of inverter 242 on line 240 goes high. If for example the current data bytes are not a XWD pattern the output of sync detector 210 is high. The flip flop output on line 238 is also high because the flip flop 218 set line does not receive a low true from synch detector 210. Since flip flop 218 is not set, its complementary output is high and the inverted falling edge passes through gate 234. The gate 234 rising edge at mid clock of the 16th bit triggers the one shot 228. The one-shot tells the data latches in each output port, to accept the data. The significant function of the one-shot 228 is to time out shortly after mid clock so that all transactions are completed before a next rising edge begins a new data word. Note that counter 216 carry line 220 signals when 16 bits form the complete data word. Only when the word is complete, does flip-flop 218 have the clock input and ability to change state. If we have detected XWD on a word boundary or we are not on a word boundary, flip-flop 218 is set with its complementary output blocking the mid-clock pulses that update data bytes in the output devices.

It is notable in the FIG. 2 system that even though an occasional analog data byte may satisfy half of the synchronization word detector 210, the digital or discrete byte portion of a word in the shift resister 206 can never match a properly conceived synchronization word, because the most significant bit is intentionally not set to a one when such digital data is processed. The setting of most significant bit in a discrete or digital data word to a zero value therefore eliminates false detection of synchronization words in the FIG. 2 system. Moreover any erroneous synchronization word resulting from a setting of the most significant bit in an analog word will be corrected upon receipt of the next data frame, an event which can occur in as little as seven ensuing bytes, since the STT transmitter is capable of exercising all of its available features in the presence of as little as a seven byte data frame. In essence therefore an erroneously detected synchronization word is quickly corrected by the appearance of a correct synchronization word.

Additionally regarding the prospect of such erroneous synchronization, since the transmitter must alternate non-analog bytes from its serial or parallel binary inputs with analog channel inputs it is highly unlikely that one of these bytes when following a 2's complement coding of the analog input channel would match up to be a false XWD. The consequence of such a match would only affect the order of bytes for the remainder of the frame at worst. Since bytes are assembled in analog and non-analog pairs, the simplest frames would not be affected at all. The false XWD can be eliminated totally by zeroing the highest non-analog bit. Printable binary characters are still possible in this instance. This means that unless there is an XWD in register 206, odd bytes (analogs) are bussed to converters like 254, and even bytes go to latches like 243 and 246.

Standard integrated circuit chip components may be used in fabricating a system according to the present invention, a system as shown in FIG. 2. These standard components may include a pair of HC 164 serial in - parallel out shift registers used for the shift register 206, a HC 688 word detector circuit used for the synchronization detector 210, a HC 221 multivibrator circuit used for the one-shot circuit 228 and one-half of a D flip flop HC 74 circuit used for the flip flop 218. Also one fourth of a HC 08 three input gate chip may be used for the AND gate 234, one sixth of an HC 04 signal inverter chip used for each of the inverters 242 and 258 and a HC 163 binary counter chip used for each of the counters 214 and 216. Additionally, a HD 139 two line to four line decoder chip may be used for the decoder 225 in FIG. 2, a 8 bit HC 553 octal latch used for each of the latches 243 and 246 and a AD 0832 digital to analog converter used for the converter 254. If is also possible to implement each of the FIG. 2 digital logic functions excepting for the one-shot 228 using a gate array logic implementation. The FIG. 2 circuit is of course deemed to be exemplary in nature and not considered a limitation of the invention or the manner of its implementation.

Figure 3:
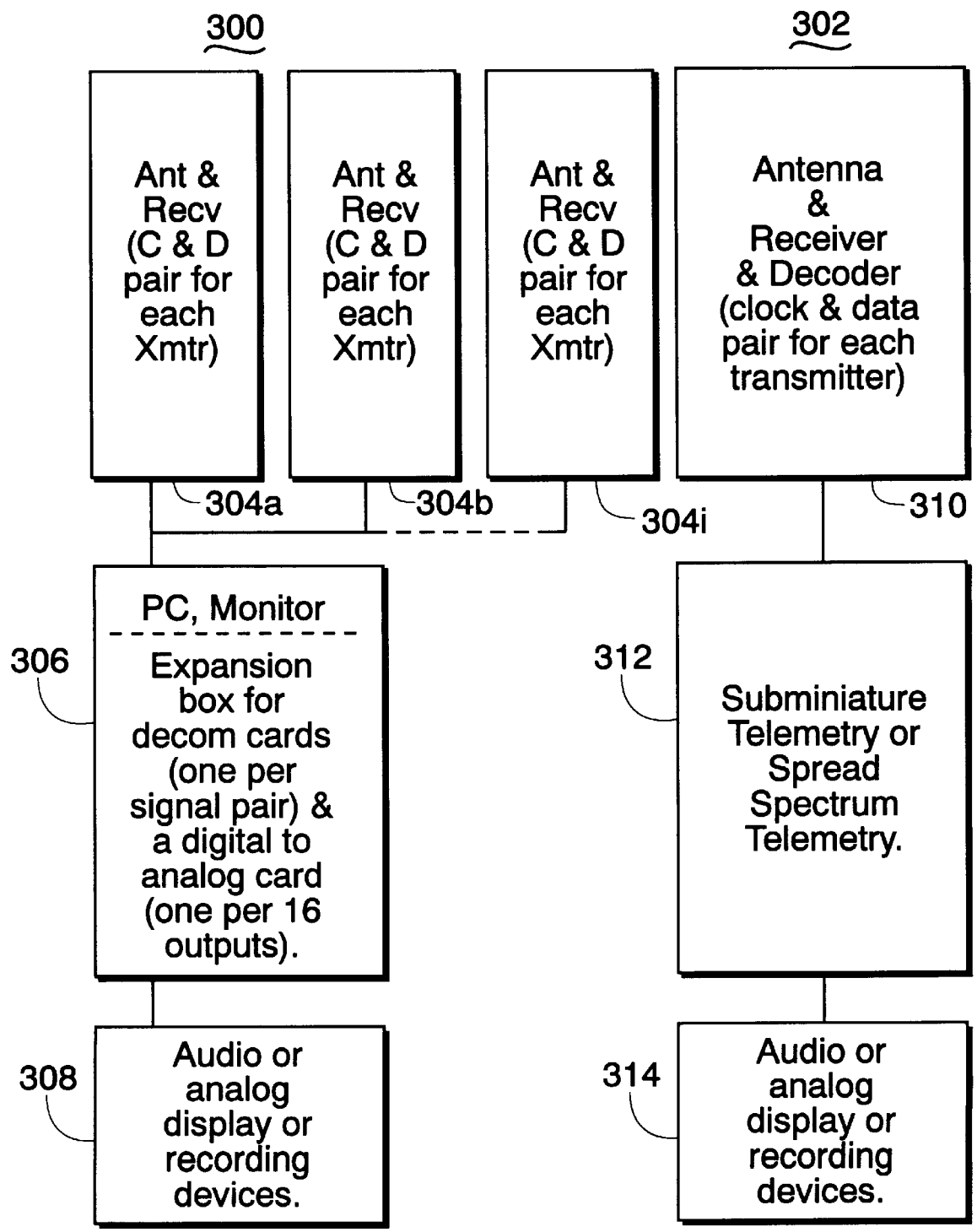
FIG. 3 shows a complexity comparison of the present invention with a conventional decommutation system.

FIG. 3 in the drawings shows a comparison of a currently used telemetry and decoder system, including a conventional commercial decommutator arrangement, with the present invention system. In the FIG. 3 drawing the antenna, receiver and decoder portions of currently used commercial and present invention systems (as are shown in overall at 300 and 302 respectively) are represented in the blocks 304*a*, 304*b*, and 304*i* and 310 respectively. In this representation it is notable that the output of the blocks 304*a*, 304*b*, and 304*i* in the presently used system are eleven in number for the FIG. 1 scene and therefore require the use of eleven decommutators—at a cost of five to eight thousand dollars each.

In the boxes 306 and 312 of the FIG. 3 drawing therefore it may be observed that the large number of decommutator printed circuit cards and analog cards in a block 306 conventional system are placed by a block 312 dedicated processor of the type described herein, a processor of simplified nature, reduced physical size and decreased cost. The audio or analog display or recording devices as represented by the boxes at 308 and 314 in the FIG. 3 drawing may be observed to be similar in nature in the two arrangements.

The present invention therefore provides a low cost albeit somewhat dedicated replacement for commercially supplied decommutator circuit cards and the often associated but separate digital to analog converter circuit cards. The system of the present invention also accomplishes a direct sorting of received data without intervention by the digital computer used in many commercial decommutation systems. The system additionally lends to fabrication in a variety of different forms including fabrication of the digital logic portions as a gate array device—where one 84 pin gate array based on system can, for example, decommutate four transmitter data streams at once.

As may be appreciated from this description the decommutator system of the present invention is achieved through detailed consideration of the employed transmitter architecture and work frame format limits. The disclosed system supports use of a single antenna, receiver and decoder apparatus for several data transmitters and also supports the use of spread spectrum radio frequency signal communication. It is particularly notable in addition that the present invention system is free of the requirement for data frames of a fixed number of words in length as is the requirement of many alternate decommutation arrangements. In the present invention a data frame is deemed to include all data words received until the next occurrence of a synchronization word.

While the apparatus and method herein described constitute a preferred embodiment of the invention, it is to be understood that the invention is not limited to this precise form of apparatus or method and that changes may be made therein without departing from the scope of the invention which is defined in the appended claims.

What is claimed is:

1. A hardware device dedicated to decommutation, and sorting by time position, the reconstruction and reinterpretation of multiple streams of serial data, from the general form of a received clock and data signal pair, representing data from one of plural receivable synchronous data transmitters each having interleaved analog and digital data bytes, said device comprising the combination of:

a serial input data register for each of said serial clock and data byte signals, said serial input data registers being coupled by a two byte input serial data path to a receiver of said streams of serial data;

a synchronization word recognizer coupled by a parallel data bus to said serial input data registers output and generating a sync detected output signal in response to synchronization word recognition;

digital to analog converter output apparatus controllably coupled to most significant bits portions of said serial input data registers by a data path inclusive of a twos complement data approximation generating apparatus;

digital data storage output apparatus controllably coupled to least significant bits portions of said serial input data registers;

control means connected to each of said output apparatus and responsive to said sync detected output signal for enabling transmitter input timing-determined updating of each said output apparatus;

said control means including memory means inhibiting data updates to said output apparatus between said sync detected output signal and a next ensuing serial data word;

said control means also including control gate means enabling update of each said output apparatus at mid clock cycle times following data settlement;

said control means also including control gate means precluding update of each said output apparatus with incomplete data byte pairs from said serial input data registers;

said control means also including control gate means precluding update of each said output apparatus with synchronization word data from said serial input data registers;

said control means also including control gate means terminating update of each said output apparatus from said serial input data registers prior to commencement of a next following clock cycle;

said control means also including counting means tracking time position of input data bytes in said serial input data registers and means for resetting said counting means in response to said sync detected output signal;

said control means also including counter means for determining completed receipt of said input data signal byte pairs in said serial input data registers;

said control means also including counter means for distinguishing between said analog and digital data signal byte pairs and controlling loading of said interleaved analog and digital data bytes into said output apparatus.

2. Dedicated hardware apparatus for decommutating an input data stream of serial data, parallel data and digitized analog data digital signal into serial data, parallel data and analog data original data forms, said apparatus comprising the combination of:

a signal reception area located shift register circuit connected to receive a serialized stream of communicated commutated serial digital data, parallel data, digitized analog data, and clock signals including periodic synchronizing word signals from a signal-receiving apparatus;

a synchronizing word detector circuit connected to said shift register circuit and providing a sync signal output;

latch memory circuits connected to said shift register circuit and providing temporarily stored output signals corresponding to said communicated serial digital data and parallel data signals;

a plurality of digital to analog converter circuits connected to said shift register circuit and providing from received parallel digital data an analog signal output corresponding with said analog data original data form;

a first counter circuit and a counter decoder circuit responsive to said sync signal output and said clock signals and providing a serialized sequence of enable signals to said plurality of digital to analog converter circuits;

a second counter circuit and a flip flop memory circuit responsive to said sync signal output and said clock signals and providing in time coincidence with said received clock signals and said sync signal a shortened update pulse for both said digital to analog converter circuits and said latch memory circuits.

3. The dedicated hardware apparatus for decommutating a data stream of claim 2 wherein said second counter and flip flop memory circuit further include a one shot multivibrator circuit generating said shortened update pulse.

4. The dedicated hardware apparatus for decommutating a data stream of claim 2 wherein said second counter and flip flop memory circuit further include a logical AND circuit connected with said received clock signals, said sync signal and said flip flop memory circuit.

5. The dedicated hardware apparatus for decommutating a data stream of claim 2 wherein said latch memory circuits connected to said shift register circuit include a first latch circuit array dedicated to reassembly of said communicated serial digital data and a second latch circuit array dedicated to reassembly of said communicated parallel data signals.

6. The dedicated hardware apparatus for decommutating a data stream of claim 2 wherein said signal reception area located shift register circuit and said synchronizing word detector circuit are each of sixteen bit word data capacity.

7. The dedicated hardware apparatus for decommutating a data stream of claim 2 wherein said hardware apparatus is comprised of a dedicated logic array.

8. The dedicated hardware apparatus for decommutating a data stream of claim 2 wherein said digital to analog converter circuits are between one and four in number.

9. The dedicated hardware apparatus for decommutating a data stream of claim 2 wherein said first counter decoder circuit is connected to a least significant bit output portion of said first counter circuit.

10. The dedicated hardware apparatus for decommutating a data stream of claim 4 wherein said flip flop memory circuit is connected with a carry signal output of said second counter circuit.

11. The dedicated hardware apparatus for decommutating a data stream of claim 2 wherein said digitized analog data comprises a plurality of analog data words and said analog data words are interspaced between digital data words in said serial input data stream.

12. A minimal hardware requirement method of decommutating a data stream of serial digital signals of unspecified word frame length into original data forms, said method comprising the steps of:

encoding into a serial data stream of interleaved digital word and digital converted analog word signals, at a sending location therefor, periodic occurrences of a word length digital synchronizing signal;

serially entering a continuing and overflowing stream of said received digital and digital converted analog data into a shift register located at a data stream reception point;

examining said data stream continuously within said reception point shift register, for a first occurrence of said word length digital synchronizing signal;

using word division hardware apparatus also located at said data stream reception point, dividing a next ensuing succession of word lengths of said serial data stream bits into successive original digital and digital converted analog data words, data words collectively comprising a data frame of unspecified length and synchronization signal to synchronization signal interval-determined word length;

storing temporarily selected of said successive data frame data words;

converting selected of said successive data frame data words into digital converted analog determined analog electrical signals;

terminating said dividing step and resetting said word division apparatus upon detection of a second occurrence of said word length digital synchronizing signal.

13. The minimal hardware requirement method of decommutating of claim 12 wherein said shift register is a serially loaded data overflow shift register of one word length.

14. The minimal hardware requirement method of decommutating of claim 12 wherein said original digital and digital converted analog data words are each plural in number in said data frame.

15. The minimal hardware requirement method of decommutating of claim 12 wherein said step of storing selected of said successive data frame data words includes storing serial digital data words and parallel digital data words as parallel disposed digital data words and said method further includes the step of converting analog signal related data words from said digital to analog signals.

16. The minimal hardware requirement method of decommutating of claim 12 wherein said step of storing temporarily selected of said successive data frame data words includes storing successive digital serial and digital parallel data words.

17. The minimal hardware requirement method of decommutating of claim 12 further including the step of inhibiting said steps of dividing, storing and converting temporarily in response to occurrence of a word length digital synchronizing signal.

18. Minimalized serial telemetry signal decommutation apparatus for reconstructing digital and analog signal data from communicated serialized digital input data signals, said apparatus comprising the combination of:

means, including shift register apparatus connected to receive and overflow with a continuing stream of said communicated serialized digital input data signals and parallel data storage elements connected with said shift register, for assembling a serially communicated digital data word into serial and parallel original digital data word formats;

means, including said shift register apparatus, for assembling a serially communicated analog data word into a parallel digital word and for communicating said parallel digital word to a plurality of digital to analog converter circuits;

synchronization signal recognition means also connected with said shift register apparatus for detecting presence of a selected synchronization word of data in said communicated serialized input signals within said shift register apparatus;

means connected with said synchronization signal recognition means for resetting selected portions of said telemetry signal decommutation apparatus in response to detection of said selected synchronization word of data in said shift register apparatus;

synchronization signal blocking means also connected with said synchronization signal recognition means for excluding said selected synchronization word of data from said parallel data storage elements and from said plurality of digital to analog converter circuits.

19. The serial telemetry signal decommutation apparatus of claim 1 wherein said synchronization signal blocking means includes a one shot multivibrator electrical timing circuit.

20. The serial telemetry signal decommutation apparatus of claim 19 wherein said synchronization signal blocking means also includes a flip flop electrical memory circuit.

21. The serial telemetry signal decommutation apparatus of claim 18 wherein said means, for communicating said parallel digital word to a plurality of digital to analog converter circuits includes sequencing means for enabling said plurality of digital to analog converter circuits in a selected time sequence.

* * * * *

UNITED STATES PATENT AND TRADEMARK OFFICE
CERTIFICATE OF CORRECTION

PATENT NO. : 6,078,632  
DATED : June 20, 2000  
INVENTOR(S) : John L. Cesulka et al.

Page 1 of 1

It is certified that error appears in the above-identified patent and that said Letters Patent is hereby corrected as shown below:

Title page,
Item [54], "DECOMMUNICATION" should be -- DECOMMUTATION --.

Column 1,
Line 1, "DECOMMUNICATION" should be -- DECOMMUTATION --.

Column 3,
Line 8, "received" should be -- receiver --.

Column 5,
Line 19, "100" should be -- 110 --.
Line 27, "ad" should be -- and --.
Line 55, "126" should be -- 136 --.

Column 8,
Line 59, "word" should be -- work --.

Column 12,
Line 25, "If" should be -- It --.
Line 64, "on" should be deleted.

Column 13,
Line 2, "word" should be -- work --.

Signed and Sealed this

Fourteenth Day of August, 2001

Attest:

NICHOLAS P. GODICI
Attesting Officer   Acting Director of the United States Patent and Trademark Office